United States Patent

Sakagami et al.

Patent Number: 5,354,135
Date of Patent: Oct. 11, 1994

[54] RECORDER AND DOT PATTERN CONTROL CIRCUIT

[75] Inventors: Wataru Sakagami; Akira Nagatomo, both of Yokohama, Japan

[73] Assignee: Canon Kabushiki Kaisha, Tokyo, Japan

[21] Appl. No.: 761,503

[22] Filed: Aug. 1, 1985

[30] Foreign Application Priority Data

Aug. 3, 1984 [JP] Japan .................. 59-162802
Dec. 27, 1984 [JP] Japan .................. 59-281621
Dec. 27, 1984 [JP] Japan .................. 59-281623

[51] Int. Cl.⁵ .......................... B47J 5/30; G06K 3/00
[52] U.S. Cl. ............................... 400/124; 395/108
[58] Field of Search .......................... 400/121, 124; 346/76 PH

[56] References Cited

U.S. PATENT DOCUMENTS

| | | | |
|---|---|---|---|
| 4,033,444 | 7/1977 | Beery | 400/124 |
| 4,039,066 | 8/1977 | Quigley | 400/124 |
| 4,071,130 | 1/1978 | Lichti | 400/124 |
| 4,125,336 | 11/1978 | Chu | 400/124 |
| 4,179,738 | 12/1979 | Fairchild | 400/121 X |
| 4,201,488 | 5/1980 | Gosset | 400/124 X |
| 4,204,777 | 5/1980 | Jen | 400/124 |
| 4,278,359 | 7/1981 | Weikel | 400/121 X |
| 4,279,199 | 7/1981 | Blanco | 400/124 X |
| 4,284,362 | 8/1981 | Jackson | 400/124 |
| 4,312,045 | 1/1982 | Jean | 400/124 X |
| 4,326,813 | 4/1982 | Lomicka | 400/124 |
| 4,400,791 | 8/1983 | Kitado | 400/124 X |
| 4,496,955 | 1/1985 | Maeyama | 400/120 X |
| 4,508,463 | 4/1985 | Wang | 400/124 |
| 4,542,997 | 9/1985 | Matsushima | 400/120 |
| 4,575,732 | 3/1986 | Kitaoka | 346/76 PH |

Primary Examiner—David A. Wiecking

[57] ABSTRACT

A recorder comprises an input port for inputting a data, an output unit for outputting data of different formats supplied from the input port as dot matrix data of identical format, and a dot matrix record unit for recording the data supplied by the output unit.

8 Claims, 10 Drawing Sheets

FIG. 1

|  | PD1 |  |
|---|---|---|
| (MSB) | D7 = 1 | ● DT1 |
|  | D6 = 0 | ○ DT2 |
|  | D5 = 0 | ○ DT3 |
|  | D4 = 1 | ● DT4 |
|  | D3 = 1 | ● DT5 |
|  | D2 = 1 | ● DT6 |
|  | D1 = 0 | ○ DT7 |
| (LSB) | D0 = 0 | ○ DT8 |

FIG. 2

|  | PD2 |  |
|---|---|---|
| (MSB) | D7 = 1 | ○ DT1 |
|  | D6 = 0 | ○ DT2 |
|  | D5 = 0 | ● DT3 |
|  | D4 = 1 | ● DT4 |
|  | D3 = 1 | ● |
|  | D2 = 1 | ○ |
|  | D1 = 0 | ○ |
| (LSB) | D0 = 0 | ● DT8 |

RECORDER AND DOT PATTERN CONTROL CIRCUIT

BACKGROUND OF THE INVENTION

1. Field of the Invention

The present invention relates to a dot pattern control circuit which stores dot pattern lines in latch means serially by pattern line and parallelly outputs the stored pattern lines, and a recorder which uses such a control circuit.

2. Description of the Prior Art

In an apparatus which forms an image by a dot matrix, an input image data and an output image data are usually coincident. For example, in a dot matrix type recorder, a recording head and a record data supplied to the recording head have one-to-one correspondence. For example, where the recording head has a line of eight recording elements such as recording wires or ink jet nozzles which form respective dots, the recording element at one end of the line is assigned to a MSB (most significant bit) and other elements are assigned to other bits in a descending order.

Figure 1:
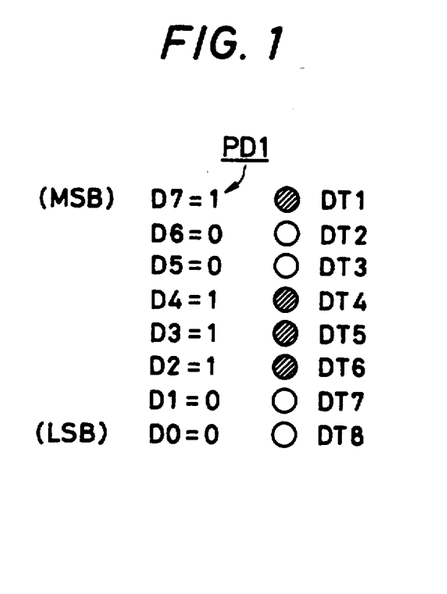
FIGS. 1 and 2 show different recording data formats of a recorder which records a data by a bit image.

FIG. 1 shows a record data in a recorder and a dot pattern formed thereby. In this apparatus, when a recording data "1" is applied to the recording head, a dot is formed on a record medium as shown by a hatched dot. If a data PD1 "10011100" is supplied, a dot pattern of dots DT1-DT8 is formed. Thus, the bits of the record data D7-D0 correspond to the dots DT1-DT8, respectively.

Figure 2:
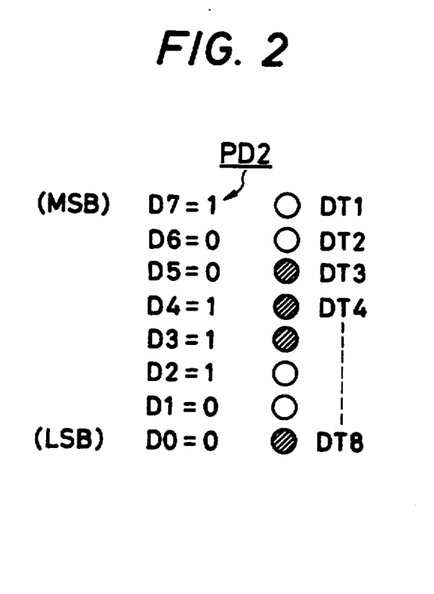

Depending on a type of a record controlling microprocessor which is connected to the recording head and a controlling gate array or drivers, the bits of the record data may be outputted in a reverse order. For example, as shown in FIG. 2, the record data having the same significance as that of FIG. 1 may be inputted in the reverse order with respect to MSB and LSB. If such a record data is recorded in the apparatus of FIG. 1, the bit image of the reverse order is formed as shown on a right hand of FIG. 2. Accordingly, it is necessary to reverse the sequence of the data bits.

The reversal of the bit sequence may be effected in hardware by changing connections of the head or the drivers. However, it requires change of wirings in a printed circuit board and cables and hence it requires a manpower and increases a cost. In order to make the apparatus fit to a plurality of record data formats, it is necessary to reverse the data bit sequence in software. In this case, however, a process time for the reversal is added to a recording time and hence a total process time increases.

The reversal is usually effected in a host unit and the reversed data is transferred to the recorder. The reversal may be effected in a microprocessor of the recorder but it increases a load to the microprocessor and leads to significant reduction of the recording speed. Further, during a record operation, the microprocessor is fully occupied by the record operation and cannot transfer data nor process other jobs. As a result, it is difficult to increase the recording speed.

SUMMARY OF THE INVENTION

It is an object of the present invention to provide a recorder and a dot pattern control circuit which can handle a plurality of data formats by a simple construction.

It is another object of the present invention to record a data at a high speed by writing a command data while a record data is outputted.

It is other object of the present invention to record a data in an efficient manner in a recorder having a variable recording head drive time.

The other objects of the present invention will be apparent from the following description of the invention.

DETAILED DESCRIPTION OF THE PREFERRED EMBODIMENTS

Figure 3:
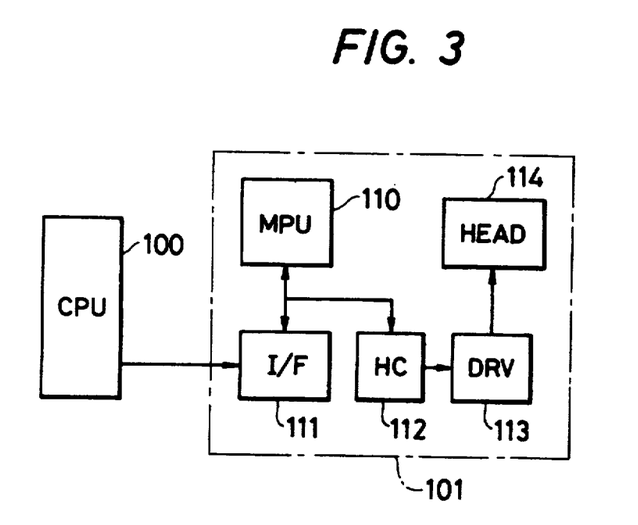
FIG. 3 is a block diagram of a control circuit.

FIG. 3 shows a block diagram of a recorder of the present invention. The recorder 101 is connected to a host system 100 such as an external computer through a data line. A print data from the host system 100 is supplied to an interface unit 111 which performs serial-to-parallel translation, level conversion and protocol control.

An output data line from the interface unit 111 is connected to a control microprocessor 110 and a recording head controller 112, and data transfer and conversion therebetween are controlled by the control microprocessor 110. The microprocessor 110 generates dot matrix patterns by an internal character generator in accordance with a code data sent from the host system 100 and sends the dot matrix patterns to data lines D0–D7 of input ports of the recording head controller 112.

The recording head controller 112 converts the recording data representing an input logical bit image to a drive data which represents a physical arrangement of the dot matrix type recording head 114 and an energization time thereof. The recording head 114 is driven by the output of the recording head controller 112 through a recording head driver 113, which converts the output of the recording head controller 112 to voltage and current levels sufficient to drive the recording head 114.

Figure 4:
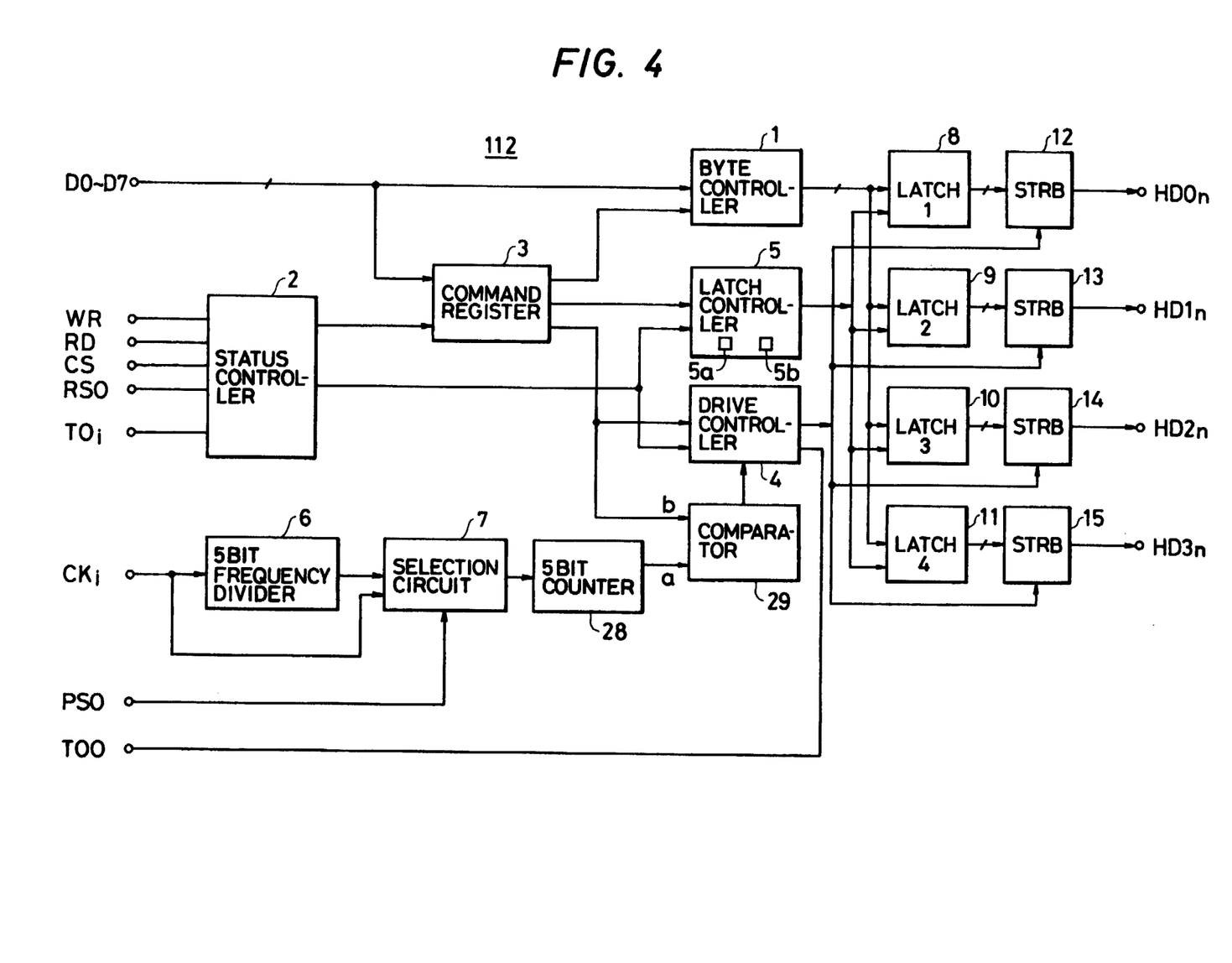
FIG. 4 is a block diagram of a head controller of FIG. 3.

In the recorder of the present invention, the recording head controller 112 is constructed as shown in FIG. 4 so that the recorder can handle the print data formats of opposite bit sequences.

The recording head controller 112 shown in FIG. 4 is controlled by an 8-bit print data and a record control command supplied through input data lines D0–D7 which are shown by a single line for simplification purpose.

The print data is supplied through a byte controller 1 which reverses the bit sequence in each byte, print data latches 8–11 which form a 4-block memory and output control circuits 12–15 to the recording head driver 113. When each of the print data latches and each of the output control circuits thereof are of 8-bit configuration and the output control circuits 12–15 are sequentially strobed, a 32(=8×4)-element thermal head, ink jet or wire dot recording head can be controlled.

The reversal and non-reversal of the byte controller 1 are controlled by the output of the command register 3 which latches the 8-bit command supplied from the data lines D0–D7. The command register 3 stores a specific address and writes a control command in response to a write signal supplied by a status controller 2 or the control microprocessor 110.

A timing of the record data latches 8–11 and a stroke timing of the output control circuits 12–15 are controlled by the status controller 2 and a drive controller 4.

The status controller 2 regulates the internal activity of the controller 112, and inputs from the MPU 110 to it include a write port WR, a read port RD, a chip select port CS, a register select port RS0 and a record start port TOI. The recording head controller 112 is constructed as one IC chip having input/output ports (HD0$_n$–HD3$_n$) shown in FIG. 4 as terminal pins. When the chip selector CS is selected by the MPU 110, the controller 112 is activated. Accordingly, the following description applies when the CS has been selected. When "1" is applied to the register select port RS0 from the MPU, the status controller 2 controls the command register 3 so that the command register 3 writes or reads a command data. Accordingly, when RS0 is "1" and the write port WR is selected, the command data supplied to the MPU 110 through the data lines D0–D7 is written into the command register 3.

The command data is of 8-bit configuration to correspond to D0–D7, of which D0–D4 are supplied to control the drive controller 4. More specifically, they are supplied in a form of binary value so that the drive controller can determined a time duration of drive of the recording head. The value thereof does not by itself indicates the drive time duration but indicates one of two absolute time durations depending on whether the selection circuit 7 selects the output for each clock pulse or the output for every 32 clocks. Thus, the value represented by D0–D4 indicates two time values, one of which is 32 times as large as the other.

The bit D5 of the command data is used to determine whether the output control circuits 12–15 are to be activated parallelly or by time-division. The bit D6 is used to determine whether the print data is to be written, byte by byte, in a normal bit sequence or in a reversed bit sequence. The bit D7 is used to determine whether the 8-bit print data in the latches 8–11 is to be written in the normal bit sequence or in the reverse bit sequence.

The command data sent through the data lines D0–D7 is written into the command register 3. In order to write the 8-bit print data sent from the MPU 110 through the data lines D0–D7 into the latches 8–11, the RS0 is set to "0" and the write port WR is selected. Under this condition, the print data is written into the latches in accordance with the data written into the command register 3. The latch controller 5 determines whether the print data received 8 bits at a time through the data lines D0–D7 is to be written in the sequence of latches 1 to 4 or latches 4 to 1, in accordance with the data stored in the command register 3, and counts the number of latches written, by an internal latch counter 5a, a function of which will be explained later.

When the print data is written, the byte controller 1, not the latch controller 5, determines whether the 8-bit dot data from D0–D7 is to be written in the normal bit sequence or in the reverse bit sequence, in accordance with the data in the command register 3.

Figure 5:
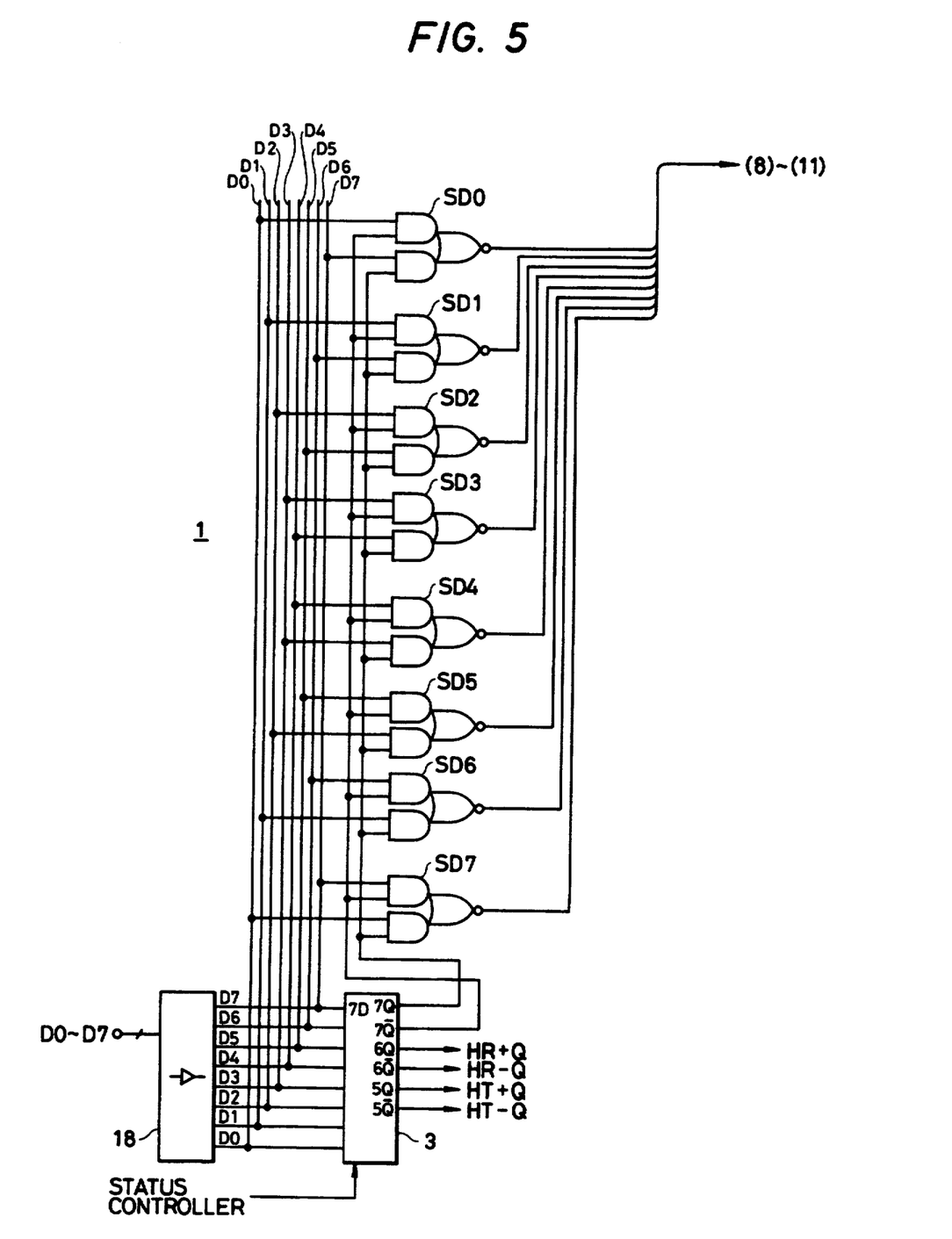
FIG. 5 is a block diagram of a byte controller and a command register of FIG. 4, FIGS. 6(a) to (d) show an input dot pattern and a reversed pattern.

FIG. 5 shows detailed configurations of the byte controller 1 and the command register 3. The byte controller 1 may comprise AND-NOR gates SD0–SD7 as shown in FIG. 5. Two AND gates of each of the AND-OR gates are two-input AND gates.

In each AND-NOR gate, one input of the lower AND gate is connected to a seventh bit output BDR of the command register 3 constructed by latches. One input of the other AND gate is connected to an inverted output BDF of the seventh bit of the command register 3. Two of the eight data buses are connected to other inputs of each of the AND-NOR gates in accordance with the reversal pattern. In the present embodiment, the record data D7–D0 is reversed to D0–D7. For example, the AND-NOR gate SD0 receives the data D7 and D0 and outputs one of the data. The output data are reversed by the NOR gates of the AND-NOR gates and sent to the record data latches 8–11.

In the embodiment of FIG. 5, the data external to the recording head controller is supplied to the internal data bus through a buffer 18.

The seventh bit output BDR or BDF of the command register 3 is high level or low level depending on the seventh bit of the control command. Accordingly, each of the AND-NOR gates SD0–SD7 picks up the signal on one of the data buses. For example, when the output BDR of the command register 3 is high level and the output BDF is low level, the AND-NOR gates SD0–SD7 output the record data of the data buses D7–D0, and when the output BDR is low level and the output BDF is high level, the AND-NOR gates SD0–SD7 outputs the record data of the data buses D0–D7.

Figure 6:
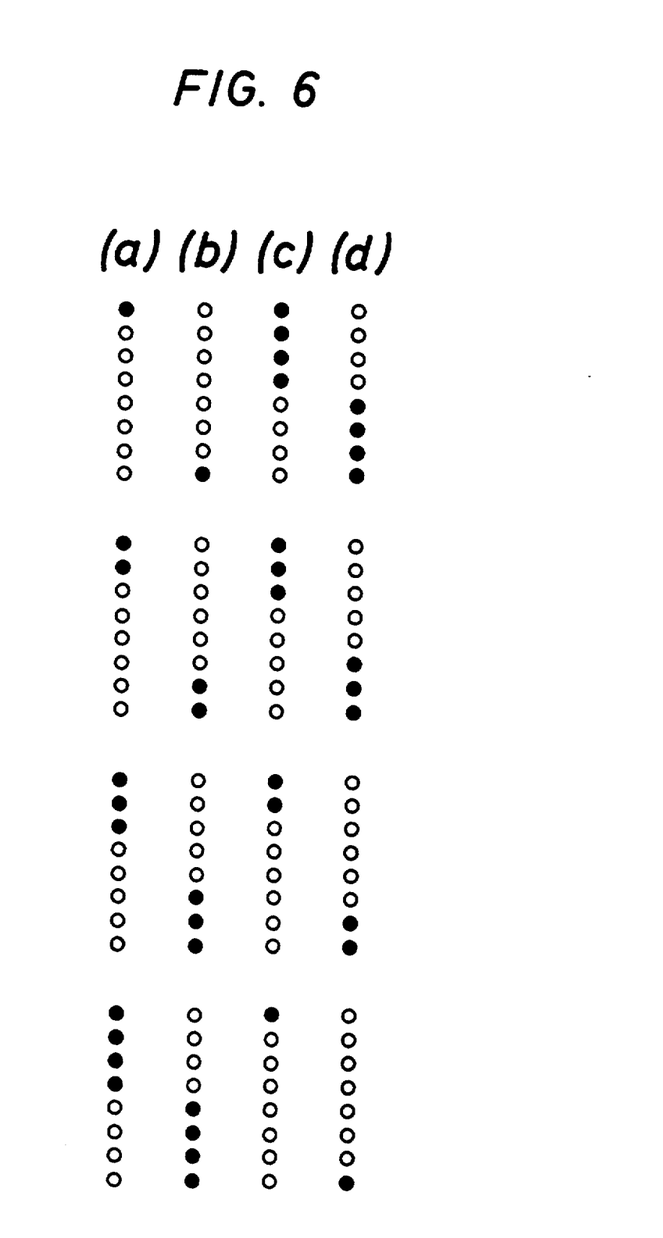

By the control of the byte controller 1 and the latch controller 5, the 4-byte print data shown in FIG. 6(a) sent through the data lines D0–D7 can be written into the latches 8–11 in one of four manners (a), (b), (c) and (d).

In this manner, when the control microprocessor 110 uses the record data of the reverse bit sequence or when the host system uses a different data format, the record data sequence which fits to the recording head configuration can be formed by the control command so that a bit image of a proper sequence is formed on a record medium. A time required for conversion is only the time required to latch the control command in the command register 3. Since the reversal command can be sent in parallel to the control command for time control, the conversion time is essentially zero. Thus, the conversion is very fast as compared with the software conversion of the prior art.

The control of the head controller 112 is effected based on a clock pulse sent from the MPU 110 to a port CKI. The clock pulse is supplied to a frequency division selection circuit 7 through a 5-bit frequency divider 6 which produces a pulse for every 32 clock pulses, and also supplied directly to the selection circuit 7. When a selection port PSO is "0", the selection circuit 7 supplies the clock pulse to a 5-bit counter 28, and when the PSO is "1", it supplies the pulse of every 32 clocks to the 5-bit counter 28. The output of the 5-bit counter 28 is supplied to a comparator 29, which compares the content of the 5-bit counter 28 with the energization time duration data D0–D4 stored in the command register 3, and if they are equal, it supplies a match output to the drive controller 4. The MPU 110 switches the input port PSO. By the switching of the input port PSO and the setting of the energization time duration data stored in the command register 3, a pulse ranging from one clock pulse duration to $2^{10} = 1024$ clock pulse duration can be produced as the match output of the comparator 29. The match output of the comparator 29 thus produced determines the energization (drive) time duration of the recording head.

The recording head controller 112 shown in FIG. 4 can be readily implemented as a gate array IC and can convert the reverse record data sequence to various sequences which fit to physical arrangements of the recording heads. Accordingly, the IC recording head controller 112 can be used in the recorder having a recording element array such as wire dot printer, thermal printer or ink jet printer. Since the conversion need not be done by the printed circuit board or cables as was done in the prior art recorder, the wiring members such as board and cables may be standardized and may be mass-produced. Thus, the cost of the apparatus is reduced.

The configuration of the record data latches 8–11 is not limited to $32(=8\times 4)$-dot configuration but it may be of any number of dot-configuration depending on the number of dots simultaneously formed in the recording head.

In the above embodiment, the bit sequence in the data string is reversed. The conversion pattern is not limited thereto but the bits may be converted from positive logic to negative logic, or high order four bits and low order four bits may be converted depending on the physical arrangement of the recording head elements or scan system. A plurality of byte controllers 1 one for each of the conversion patterns may be provided so that they are assigned to the respective conversion patterns.

Figure 8:
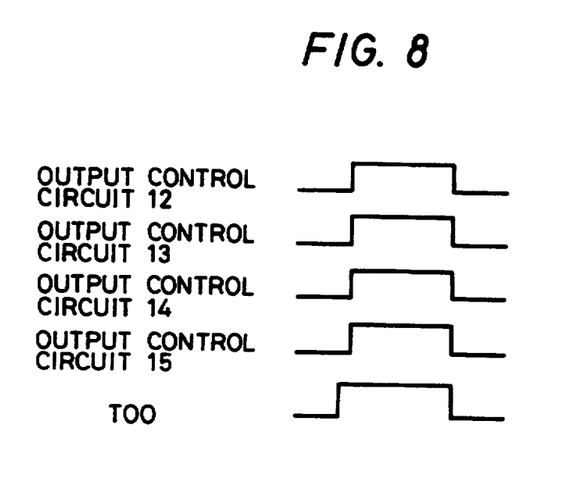
FIG. 8 shows output waveforms in parallel drive.

On the other hand, the switching between parallel drive and time-division drive is effected by signals HT+Q and HT−Q of the command register 3 shown in FIG. 5. When the parallel drive is required, HT+Q is rendered high level and HT−Q is rendered low level. As a start of print trigger signal is applied, the output signals of the latches 8–11 are parallelly sent to the output control circuits 12–15 which parallelly output the signals as shown in FIG. 8. On the other hand, when the time division drive is required, HT+Q is rendered low level and HT−Q is rendered high level. As the print trigger signal is applied, the output control circuits 12–15 produce the time-division outputs.

In this manner, the parallel drive and the time division drive can be selectively operated to prevent a large current from momentarily flowing into the recording head so that a drive power supply may be reduced in size.

The print sequence in the time division drive can be changed by HR+Q and HR-Q of FIG. 5.

While four print data latch circuits 8–11 and four output control circuits 12–15 are shown in FIG. 4, any number of sets may be used. In the time division drive, any print sequence may be used, and multi-color high speed printing can be attained by the time division drive of the print head and the timer.

Figure 9:
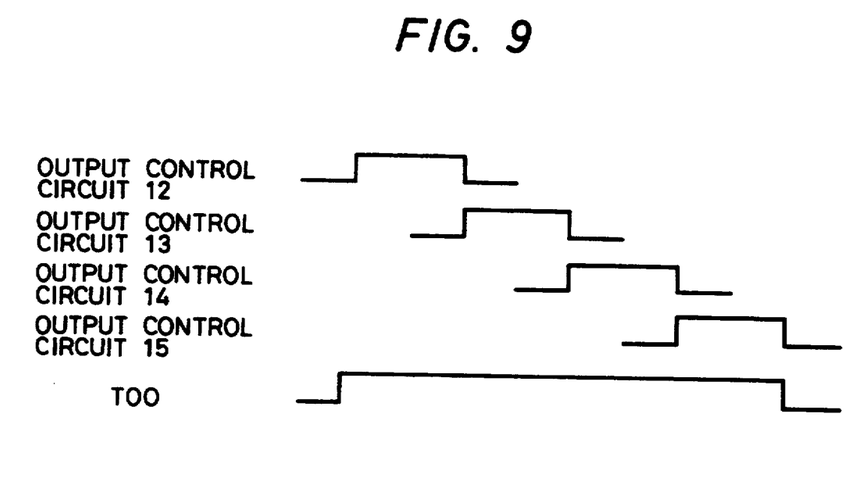
FIG. 9 shows output waveforms in time-division drive.

In the time division drive, four-division may be used as shown in FIG. 9. Since the number of time-divisions is automatically changed by the print data latch circuits, it is not necessary to change the number of time-divisions as the number of print data latch circuits changes. Thus, high speed printing is attained.

Figure 7A:
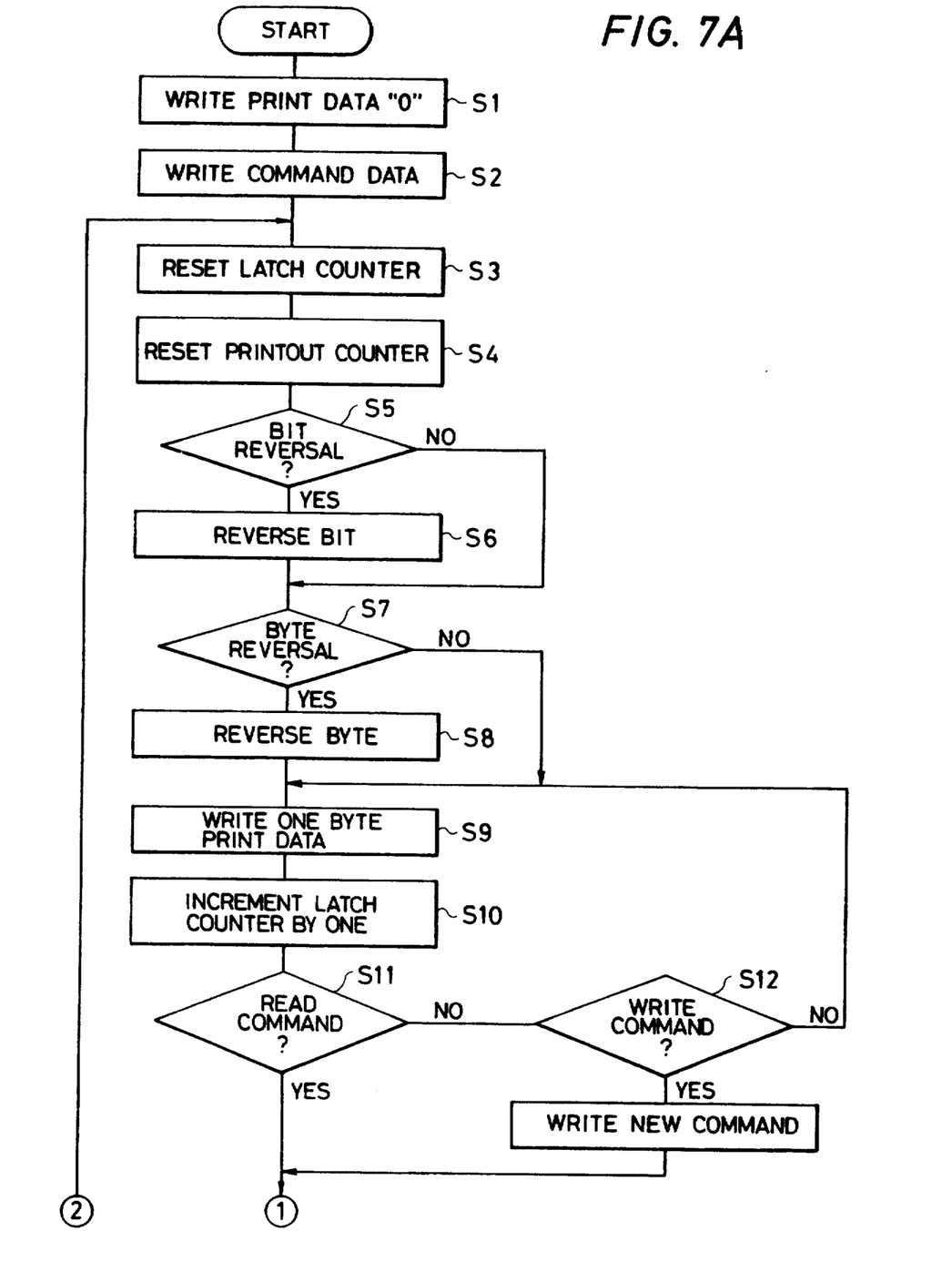
FIGS. 7A and 7B are flow charts.
Figure 7B:
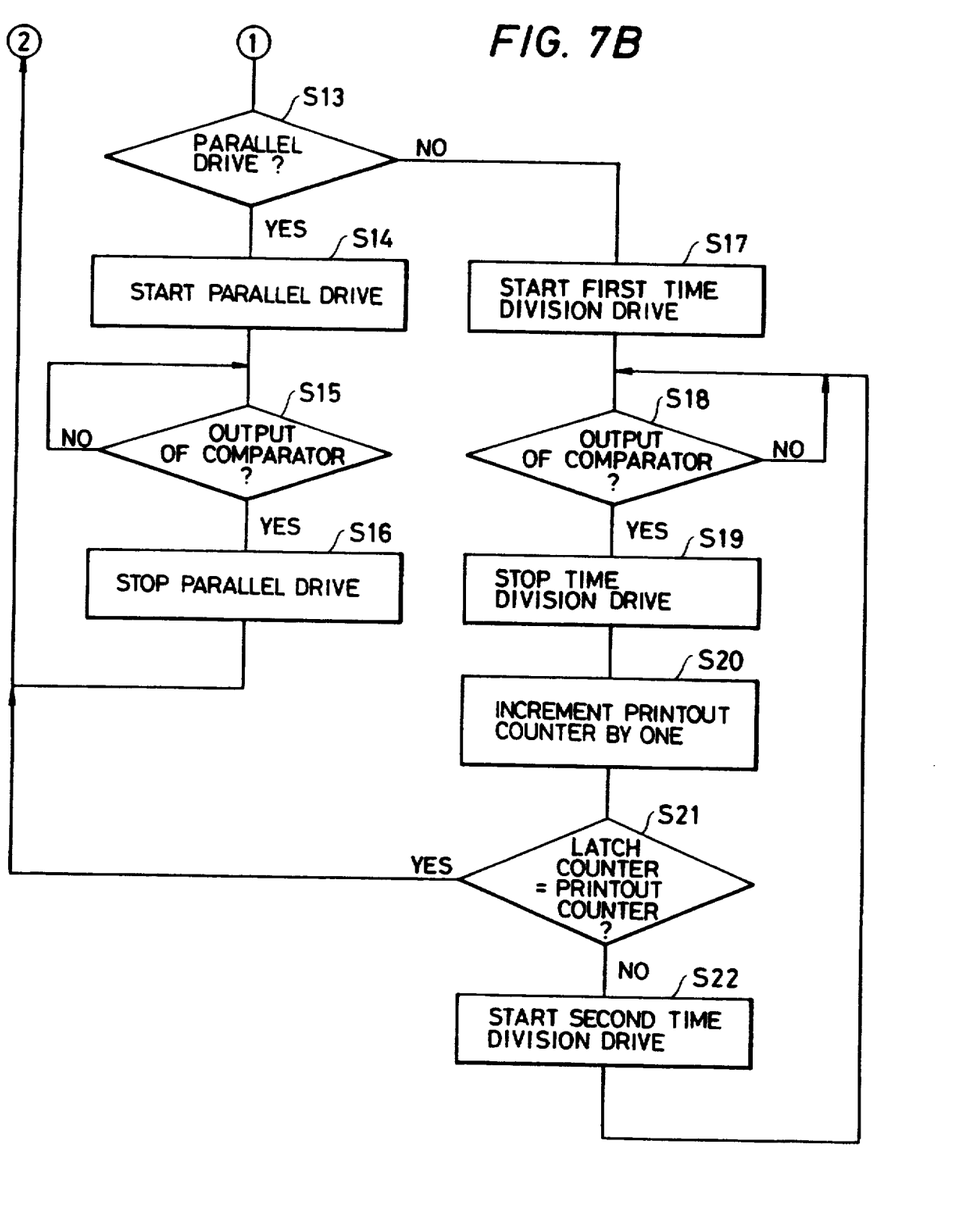

The operation of the recorder thus constructed is now explained with reference to flow charts of FIGS. 7A and 7B.

Basically, the host system 100 sends the print data to the recorder 101 which prints it out. In the recorder, the drive controller sends a print busy signal T00 to the MPU 110 so that the MPU 110 responds to the signal T00 to process the print data sent from the host system 100 with a minimum loss time. Since the MPU 110 can carry out other jobs during the print operation, the high speed printing is attained. In the following description, only the operation in the recorder 101 is explained.

In a step S1, the MPU 110 resets RSO of the status controller 2 to "0" so that the latches 8–11 latch "0" through the data lines D0–D7. In a step S2, the MPU 110 sees RSO of the status controller 2 to "1" and selects the write port WR so that the command data is stored in the command register 3 through the data lines D0–D7. If RSO is "1" and the port WR is selected in synchronism with the write command, the status controller 2 is activated to control the drive controller 4 and the latch controller 5 so that the contents of the latches 8–11 are outputted to the output control circuits 12–15. However, since the latches store "0" therein, no recording is made by the recording head.

After the command data has been written, the latch counter 5a and the printout counter 5b in the latch controller 5 are reset to "0" in steps S3 and S4.

The print data is then latched into the latches 8–11 while RSO of the status controller 2 is "0" and the port WR is selected. Prior to that, the command register 3 is read to check if the reversal in the one-byte print data is required or not (step S5) and if the reversal between the byte is required or not (step S7). If the reversal is required, the reversal process is performed (steps S6 and S8). The bit reversal in the one-byte print data is carried out by the byte controller 1 and the reversal between the bytes of the print data is carried out by the latch controller 5 to latch the data from the latch 8 to the latch 11 or from the latch 11 to the latch 8. In this manner, one-byte print data is written into the latches in a step S9. In a step S10, the latch counter 5a is incremented by one. In a step S11, whether the status controller 2 is in a read command status (RSO="1", port RD is selected) or not is checked. If it is not in the read command status, whether it is in a write command status (RSO="1", port WR is selected) or not is checked. If it is not in the write command status, one-byte print data is written in the step S9. The above steps are repeated to write the print data into the selected latches in the predetermined manner.

In the step S11, if the status controller 2 is in the read command status, the command in the command register 3 is read so that the latch controller 5 and the drive controller 4 are controlled by the command. The print busy signal is generated at an output T00, and in a step S13, whether the parallel drive is required or not is checked. If the parallel drive is required, the drive controller 4 parallelly activates the output control circuits 12–15 to send the print data in the latches 8–11 to the recording head driver 113 to drive the drive elements (e.g. heat generating elements, piezoelectric elements or solenoids) of the recording head 114. In synchronism with the activation of the output control circuits 12–15, the clock pulse is applied to the port CKI so that the comparator 29 compares the content of the 5-bit counter 28 with the energization time duration data in the command register 3 (step 15). If they are equal, the comparator 29 sends the match output to the drive controller 4, which then deactivates the output control circuits 12–15 (step S16).

FIG. 8 shows the output signals of the output control circuits and the print busy signal T00. The print busy signal disappears in synchronism with the disappearance of the signals from the output control circuits. In this manner, the recording head 114 is driven for the energization time duration stored in the command register 3. As the parallel drive is stopped, the step S3 is carried out and the same steps are repeated. FIG. 8 show the waveforms when the print data is written into all latches 8–11.

In the step S13, if the time division drive is required, the output control circuit corresponding to the latch to which the print data was first written is first activated by the drive controller 4 (step S17), and the clock pulse is applied to the port CKI so that the output control circuit produces the output signal only for the period corresponding to the energization time duration stored in the command register (step S18 and S19). When the first time division drive is stopped, the printout counter 5b is incremented by one (step S20) and the content of the latch counter 5a is compared with the content of the printout counter 5b. When the contents are not equal, the output control circuit corresponding to the latch to which the second print data was written is activated in a step S22, and then the step S18 is carried out. The above steps are repeated so that the output control circuits are driven in the time division fashion, and when the content of the latch counter 5a and the content of the printout counter 5b are equal, the print operation terminates and the process returns to the step S3.

FIG. 9 shows the outputs of the output control circuits and the print busy signal T00. In the time division drive, the print busy signal T00 disappears when the output of the last output control circuit disappears.

In the present embodiment, the one-byte print data can be stored in the print data latches 8–11 in either normal or reverse sequence, and a multi-byte print data can be stored in the reversed sequence for each byte.

In the present embodiment, the print data need not be written into all print data latches 8–11 and the output control circuits 12–15 are activated by the read command (status controller 2 RSO="1", the port RD is selected) or the write command status controller 2 RSO="1", WR is selected) so that the print data is not written into unnecessary latches. Thus, the process time is shortened.

In the present embodiment, the output control circuits 12–15 can be activated by the write command. Accordingly, the recording operation can be carried out while the command data is updated. Thus, in a serial recorder, the command data can be updated during the run of the recording head without interrupting the record operation so that the recording mode is changed in the course of the print operation.

In the present embodiment, various energization times of the recording head can be set of controlling the selection circuit 7 by the port PSO and comparing the content of the 5-bit counter 28 with the content of the command data by the comparator 29.

In the present embodiment, the drive controller 4 produces the print busy signal (T00) during the energization of the recording head and it is sent to the microprocessor MPU 110. Thus, the MPU 110 can process the next print data as soon as the print operation is over and can execute other jobs during the print operation. Accordingly, the print speed as a whole is significantly increased. By monitoring the print busy signal T00, the energization of the recording head for extraordinary long period is prevented and hence effective protection of the recording head is provided.

Figure 10:
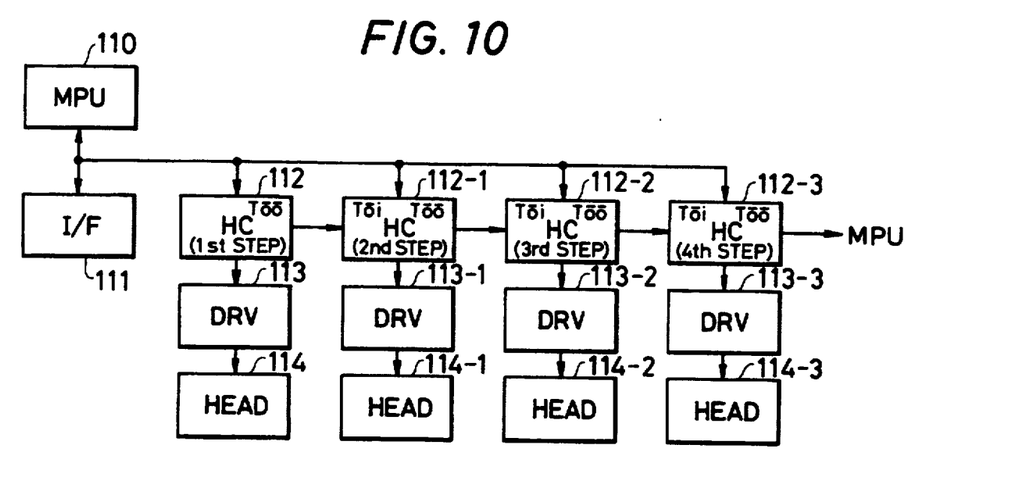
FIG. 10 is a block diagram of another embodiment.
Figure 11:
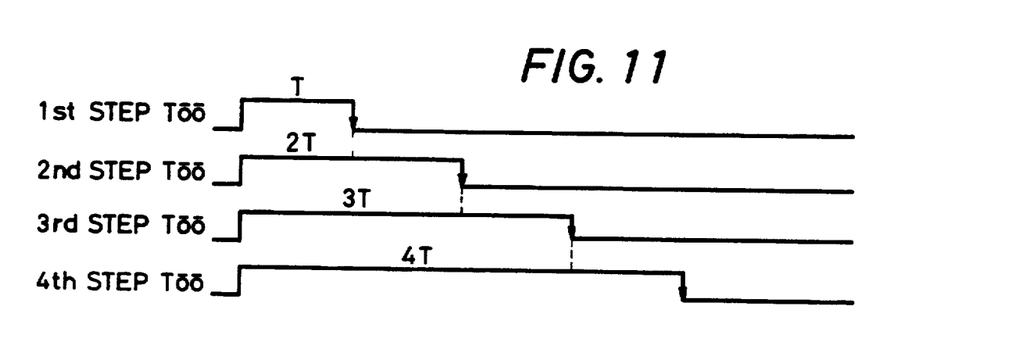
FIG. 11 shows waveforms at T00 when a preceding stage recording head is driven.

FIG. 10 shows another embodiment of the present invention, in which four stages of head controllers 112, drivers 113 and recording heads 114 are arranged in parallel. Each of the stages performs recording in one of different colors so that color recording is attained. In the present embodiment, the output T00 of the first stage head controller 112 is supplied to an input T0I of the second stage head controller 112-1, the output T00 of the second stage head controller 112-1 is supplied to an input T0I of the third stage head controller 112-2 and so on so that the stages are cascade-connected. As the output T00 of the preceding stages are applied to the input ports T0I of the head controllers 112-1 to 112-3, each stage is activated at the fall of the T0I input to the stage. As shown in FIG. 11, in the first stage, the recording head 114 is energized for the time period T during which the output T00 is produced. In the second stage, the recording head 114-1 is energized for the time period T following the fall of the T00 output of the first stage. In the third stage, the recording head 114-2 is energized for the time period T following the fall of the T00 output of the second stage, and in the fourth stage, the head 114-3 is energized for the time period T following the fall of the T00 output of the third stage. In this manner, the recording heads in the respective stages are energized in the time division fashion and the T00 output of the fourth stage controller 112-3 continuously produces the print busy signal during this period. The T00 output of the head controller 112-3 is sent to the host system 100 through the interface circuit 111. When this signal falls, the host system 100 determines that the print operation is over and sends the next print data or command data to the recorder 101. The host system 100 monitors the T00 output to prevent the recording head from being energized for an abnormally long period.

In the above case, the first to fourth recording heads are energized, when the print data is not present, they may not be energized. This control is effected by the host system 100. If the fourth stage is not activated, the T00 output of the fourth stage head controller 112-3 falls when the T00 output in the last activated stage falls in order to indicate the exact time of end of printing.

Figure 12:
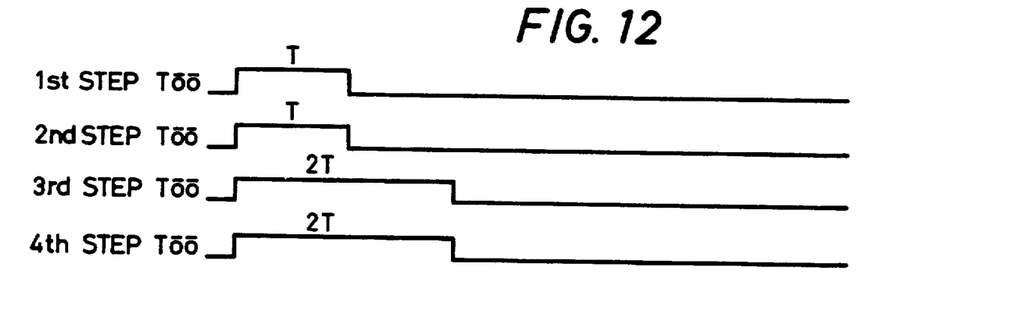
FIG. 12 shows waveforms at T00 when first and third stage recording heads are driven.

FIG. 12 shows the T00 output waveforms when the first and third stage recording heads are energized. When some of the intermediate stages are not energized, the T00 output of the fourth stage head controller 112-3 is produced for a total time of the stages to be activated. Thus, the recording is more efficiently done.

In the present embodiment, the head controllers of the succeeding stages are time-divisionally activated in sequence as the first stage head controller 112 is once driven. Thus, the load of the MPU 110 is reduced since the recording heads in the respective stages are time-divisionally driven, a large current is not required at one time and the power supply may be reduced in size. In order to further reduce the size of the power supply, the recording heads in the respective stages may be time-divisionally driven.

The present invention is not restricted to the illustrated embodiment but it may be applied to other output device than the recorder such as a dot matrix type display. While the bit sequence of the print data is reversed in the present embodiment, the present invention is applicable to the reversal of white and black dots of the image.

Figure 13:
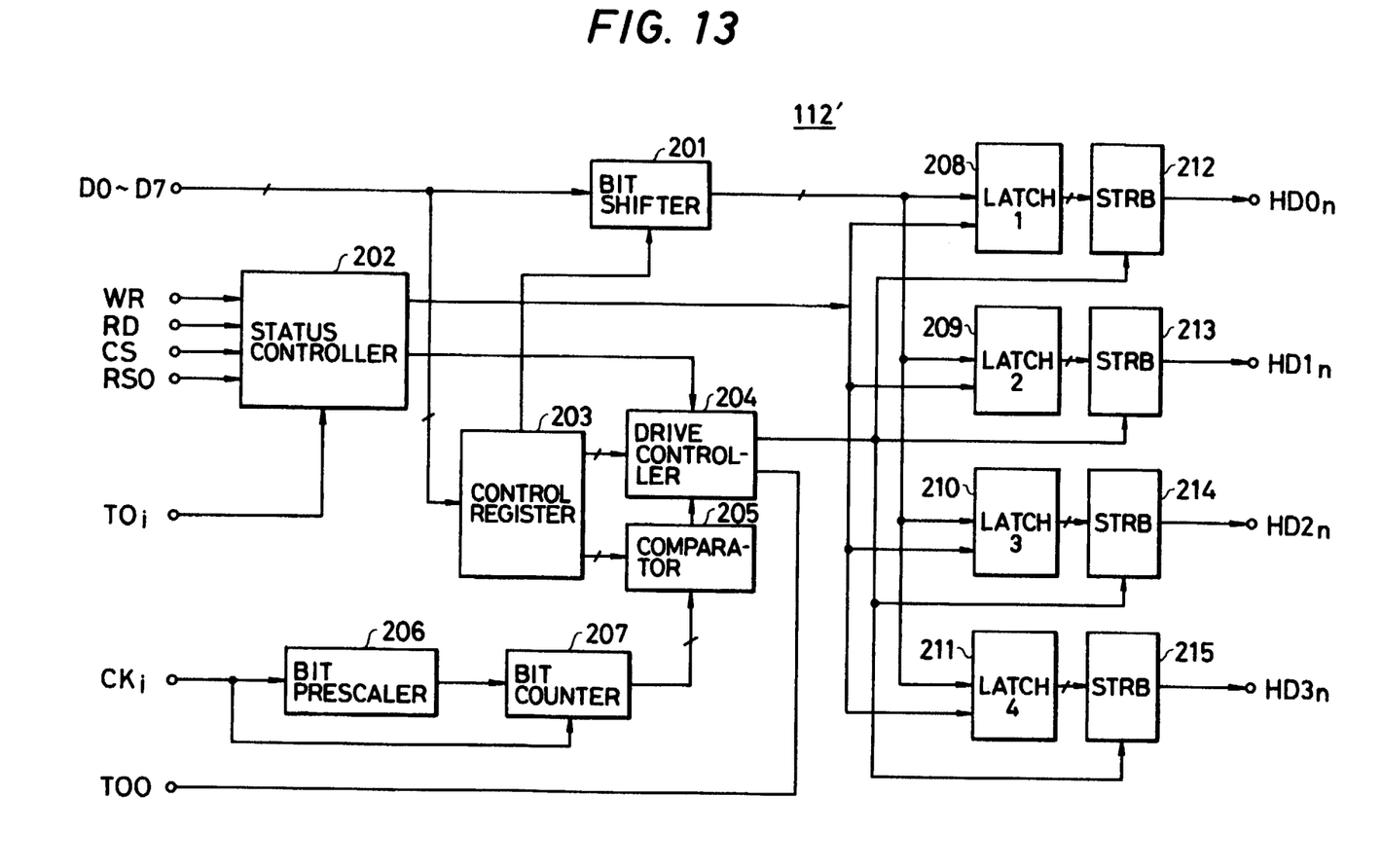
FIG. 13 shows a block diagram of another embodiment of a head controller 112'.

Another embodiment of the head controller 112 is shown in FIG. 13. The recording head controller 112' shown in FIG. 13 receives the 8-bit record data and the record control command through the input data lines D0–D7 which are shown by a single line for simplification purpose.

The record data is supplied through a bit shifter 201 which reverses the bit sequence, 4-block record data latches 208–211 and output control circuits 212–215 to the recording head driver 113. The record data latches and the output control circuits are of 8-bit configuration and the output control circuits 212–215 are sequentially strobed. In this manner, the 32(=8×4)-element recording head such as thermal head, ink jet head or wire dot head is controlled.

The reversal and non-reversal in the bit shifter 201 are controlled by an output of a control register 203 which latches the 8-bit command supplied through the data lines D0–D7. A specific address is set in the control register 203 and the control command is written by a write signal supplied from a status controller 202 or the control microprocessor 110.

The latch timing of the record data latches 208–211 and the strobe timing of the output control circuits 212–215 are controlled by the status controller 202 and the drive control circuit 204.

The status controller 202 has write, read, chip select and reset inputs and it is controlled by the control microprocessor 110. For example an address may be set in the record data latches 208–211 and the status controller 202 is selected by a decoded output of the address data supplied from the control microprocessor 110, and the write signal is applied so that the status controller 202 can latch the record data latch 208. In this manner, the data to be sent to the respective blocks are determined.

The drive control circuit 204 controls the output control circuits 212–215 to adjust the synchronization of the energization timing of the recording head and the energization time. The energization time is determined by the drive control circuit 204 which strobes the output control circuits 212–215 for a time period corresponding to the control command latched in the control register 203 and supplied through the data lines D0–D7. The synchronization of energization and the energization time are controlled by the clock supplied through a terminal CKi. The input clock supplied to a 6-bit prescaler 206 and a 5-bit counter 207, and the 5-bit output of the 5-bit counter 207 which is shifted by the clock is compared with 5 bits of the control command latched in the control register 203 by a comparator 205, the drive control circuit 204 determines the end timing of the energization in accordance with the compare signal output from the comparator 205.

The start timing of recording is given by a time-out signal supplied to a status controller 202 from a terminal TOi, and the end of recording is informed to the control microprocessor 110 by a time-out output signal supplied by the drive control circuit 204 through a terminal TOo. The start of record timing may be given by reading or writing the status controller 202.

Figure 14:
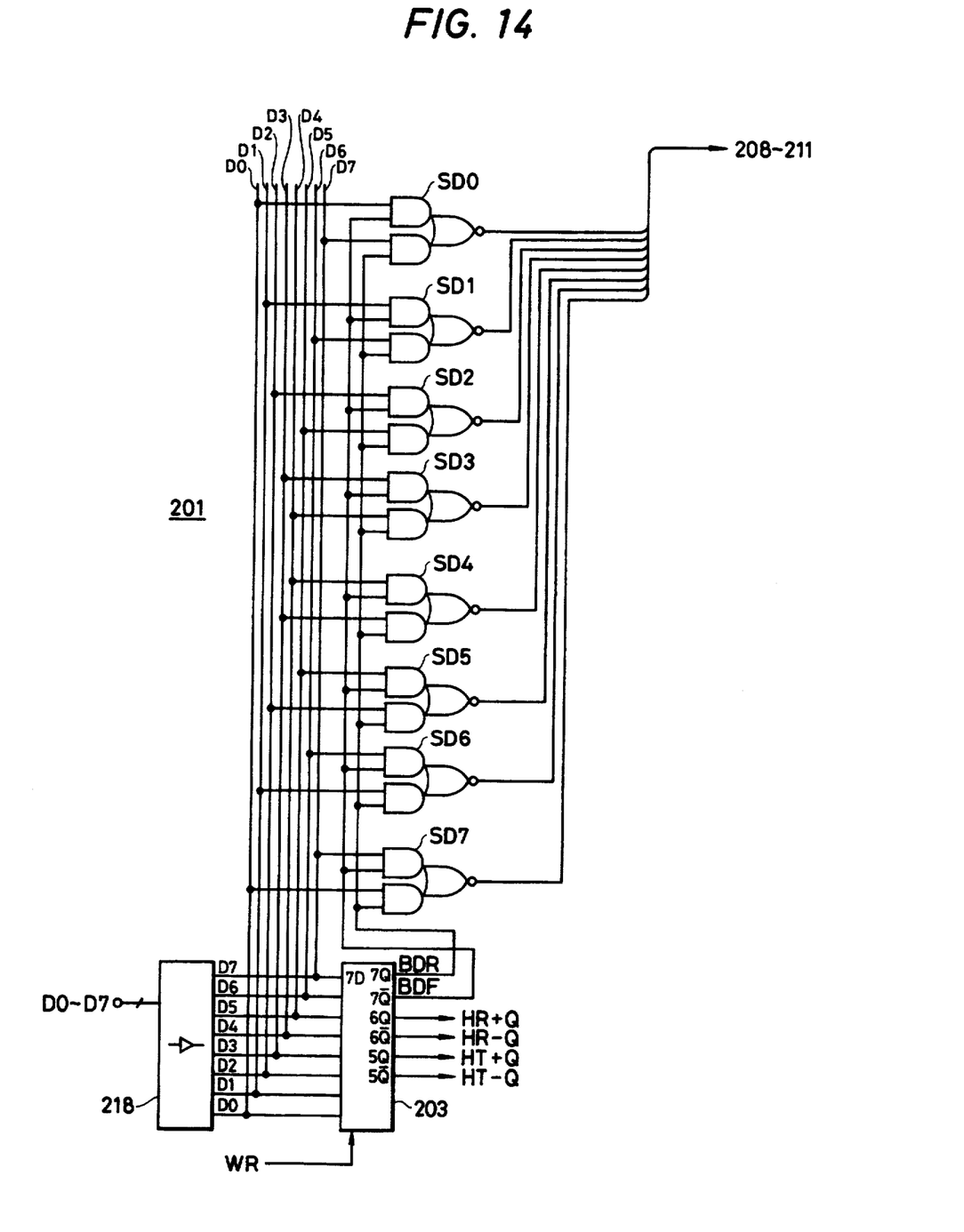
FIG. 14 is a block diagram of a bit shifter and a control register of FIG. 13.

Details of the bit shifter 201 and the control register 203 are shown in FIG. 14.

The bit shifter 201 comprises AND-NOR gates SD0–SD7. Two AND gates of each of the AND-NOR gates each comprise a two-input gate.

One input of a lower AND gate of each AND-NOR gate is connected to a seventh bit output BDR of the control register 203 which comprises a latch. One input of the other AND gate is connected to a seventh bit inverted output BDF of the control register 203. The remaining inputs of each AND-NOR gate are connected to two of eight data buses in accordance with the reversal pattern. In the present embodiment, the record data sequence D7–D0 are reversed to the sequence D0–D7. For example, the AND-NOR gate SD0 receives the data D7 and D0 and outputs one of the data. The output data is inverted by the NOR gate of the AND-NOR gate and the inverted data is sent to the record data latches 208–211 of FIG. 13.

In FIG. 14, the data external to the recording head controller is supplied to the data bus through a buffer 218.

The control register 203 has a write terminal WR and a specific address and when the decoded write signal is applied to the terminal WR, the record control command is latched. This command is retained in the control register 203 until it is updated by the next command. The MSB (D7) of the control command contains "1" or "0" data which indicates reversal or non-reversal of the bit sequence of the record data. The seven remaining its of the control command are assigned for energization timing of the recording head and control of the energization time. The latched data are supplied to the drive control circuit 204 and the comparator 205.

The control microprocessor 110 outputs a desired control command which indicates the reversal or non-reversal of the bit sequence of the record data, the energization time and the energization timing, and selects the address of the control register 203 so that the control command is latched in the control register 203 and retained therein.

The seventh bit output BDR or BDF of the control register 203 is high level or low level depending on the seventh bit of the control command. Accordingly, the AND-NOR gates SD0–SD7 each picks up the signal on one of the data buses. For example, when the output BDR of the control register 203 is high level and the output BDF is low level, the AND-NOR gates SD0–SD7 output the record data of the data buses D7–D0, and when the output BDR is low level and the output BDF is high level, the AND-NOR gates SD0–SD7 output the record data of the data buses D0–D7.

When the control microprocessor 110 uses the reversed record data or the host system uses a different data format, the record data string which fits to the arrangement of the recording head can be readily formed by the control command so that a bit image in a proper sequence is formed on a record medium. The time required for conversion is only the time to latch the control command in the control register 203. Since the reversal command can be sent in parallel with time control command, the conversion time is essentially zero and the conversion speed is much higher than that in the software method of the prior art.

The recording head controller 112' shown in FIG. 13 can be readily implemented as a gate array IC and it can convert the reverse record data string to any of the various recording head physical arrangements. Accordingly, the IC recording head controller 112' can be applied to a recorder having one of various recording element arrays such as wire dot printer, thermal printer or ink jet printer.

In this case, since the conversion need not be done by the printed circuit board or cables as was done in the prior art recorder, the wiring members such as the circuit board and the cables may be standardized and mass-produced. Thus, the cost is significantly reduced.

The switching of the parallel drive and the time-division drive is effected by HT+Q and HT−Q. If the parallel drive is required, HT+Q is rendered high level and HT−Q is rendered low level.

If the start of print signal is supplied after the print data has been latched, T00 is rendered high level by the drive control circuit 204.

We claim:

1. A recorder comprising:
   interface means adapted to be connected to an external unit for entering dot pattern data and command data;
   first memory means for storing the dot pattern data;
   second memory means for storing the command data;
   recording means for recording the contents of said first memory means; and
   control means for writing command data in said second memory means upon receipt of a writing instruction signal, for reading command data out of said second memory means upon receipt of a reading instruction signal, and for initiating recording by said recording means upon receipt of either the writing instruction signal or the reading instruction signal.

2. A recording according to claim 1, wherein said first memory means has a plurality of unit memories each capable of storing a plurality of dots, and a recording element is provided for each of the unit memories.

3. A recording according to claim 2, further comprising means for determining an energization time of the recording elements.

4. A recording according to claim 1, wherein the command data has a content defining the format of the dot pattern data when the dot pattern data transmitted from the external unit through said interface means are written in said first memory means.

5. A dot pattern control circuit comprising:
   an input port for entering dot pattern data and command data;
   a first memory for storing the dot pattern data;
   a second memory for storing the command data;
   driver means for producing a visual output signal which represents the contents of said first memory; and
   control means for wiring command data in said second memory upon receipt of writing instruction signal, for reading command data out of said second memory upon receipt of a reading instruction signal, and for initiating the visual output of said driver means upon receipt of either the writing instruction signal or the reading instruction signal.

6. A dot pattern recording according to claim 5, wherein said first memory includes a plurality of unit memories each capable of storing a plurality of dots, and a recording element is provided for each of the unit memories.

7. A dot pattern recording according to claim 6, further comprising means for determining an energization time of said recording elements.

8. A dot pattern recording according to claim 5, wherein the command data has a content defining the format of the dot pattern data when the dot pattern data transmitted through said input port are written in said first memory.

* * * * *

UNITED STATES PATENT AND TRADEMARK OFFICE
CERTIFICATE OF CORRECTION

PATENT NO. : 5,354,135  
DATED : October 11, 1994  
INVENTOR(S) : Wataru SAKAGAMI, et al.

Page 1 of 2

It is certified that error appears in the above-indentified patent and that said Letters Patent is hereby corrected as shown below:

COLUMN 2:

Line 4, "other" should read --another--.

COLUMN 3:

Line 47, "indicates" (first occurrence) should read --indicate--.

COLUMN 7:

Line 21, "show" should read --shows--.

COLUMN 8:

Line 12, "extraordinary" should read --an extraordinarily--.

UNITED STATES PATENT AND TRADEMARK OFFICE
CERTIFICATE OF CORRECTION

PATENT NO. : 5,354,135
DATED : October 11, 1994
INVENTOR(S) : Wataru SAKAGAMI, et al.

It is certified that error appears in the above-indentified patent and that said Letters Patent is hereby corrected as shown below:

COLUMN 12:

Line 1, "recording" should read --recorder--;
Line 5, "recording" should read --recorder--;
Line 8, "recording" should read --recorder--;
Line 28, "recording" should read --control circuit;
Line 33, "recording" should read --control circuit--;
Line 36, "recording" should read --control circuit--.

Signed and Sealed this

Sixteenth Day of May, 1995

BRUCE LEHMAN

*Attest:*

*Attesting Officer*     *Commissioner of Patents and Trademarks*